2,868,657
Patented Jan. 13, 1959

2,868,657

SILICONE COATING COMPOSITIONS

Louis M. Sesso, Racine, Wis., assignor to S. C. Johnson & Son, Inc., Racine, Wis.

No Drawing. Application November 15, 1955
Serial No. 547,041

4 Claims. (Cl. 106—10)

This invention relates to protective coating compositions containing organopolysiloxanes and more particularly relates to coating compositions containing methylethyl polysiloxane which have remarkable properties, such as high gloss, durability, excellent wetting characteristics, etc., yet which may be used with significant reduction of the deleterious refinishing problems normally associated with articles treated with silicone coatings and polishes.

Approximately eight or nine years ago, an organopolysiloxane or "silicone," namely dimethyl polysiloxane, was incorporated in polishing and coating compositions, such as may be used on wood or metal surfaces, with significant results. It was found that coating compositions could be prepared using this material which were easy to apply to most surfaces, and which could be easily buffed to produce a lustrous film.

While these polish compositions were generally satisfactory in many instances a number of difficulties were encountered in connection with their use. Some compositions exhibited a tendency to agglomerate when spread on a surface so that an evenly distributed film was hard to obtain. This characteristic required that fairly large amounts of wax be included with the silicone fluid to prevent crawling of the fluid into islands when spread on a surface. However, even with the inclusion of wax, the durability of finished films produced from these polish compositions was found to be somewhat limited, since the waxy portion of the film could be fairly easily wiped off a treated surface.

It was also discovered that the inclusion of the dimethyl fluid created serious difficulties in the refinishing of surfaces which had previously come in contact with a product containing the fluid. When a surface is prepared for refinishing, it is practically impossible to completely remove all traces of the silicone fluid which has been applied thereto. The presence of very small quantities of fluid remaining on a surface creates a spotty, pitted effect in the ordinary lacquer or enamel finishes applied thereto.

Other organopolysiloxane fluids, such as the diethyl and phenyl types were found to be quite unsatisfactory when used along with waxes, exhibiting a tendency to plasticize the waxes and create films which were greasy and hard to buff. Mixtures of the above fluids have not been satisfactory, since the mixtures were found to retain the individual characteristics of the fluids used.

In an effort to produce improved compositions containing silicone fluids whereby the above difficulties could be eliminated or substantially minimized, silicone fluids available commercially, as well as a number of specially prepared fluids, were thoroughly analyzed. From these observations, it was discovered that the physical behavior of silicone fluids could be explained satisfactorily in terms of the compatibility which the silicone displayed with other organic materials, and the affinity these silicones showed with the usual lacquered or enameled surface.

These silicone materials, it was found, which were quite incompatible with wax generally exhibited the best lubricity when used with the various waxes, facilitating the spreading of a coating composition over a surface and producing films which were easily buffed. These silicone fluids also were found to have little, if any, plasticizing effect on waxes used therewith. Excessive incompatibility of silicone fluids for the waxes was found, however, to decrease the durability of films produced from silicone fluids and waxes since the waxy part of the film could be easily wiped off with little or no adherence to the surface unless excessive amounts of waxes were used. This use of large amounts of wax, however, tends to reduce or eliminate the easy buffing characteristics of silicone compositions. The incompatibility of the silicone fluids for lacquers or enamels was found to be of prime importance when a surface containing traces of silicones is coated with a lacquer or enamel. The extremely incompatible silicones could not be covered satisfactorily without the formation of pitted areas, whereas the more compatible fluids exerted negligible effect on coatings subsequently applied.

The affinity of organopolysiloxanes for a lacquered or enameled surface was found to be a factor in considering the dispersion characteristics of the fluid, i. e., its ability to "lay down" in a continuous film. These fluids which showed little affinity for a lacquered surface, for instance, would gather in islands when applied to a surface unless substantial amounts of wax were included with the silicone fluid.

Consideration of the above factors lead to the discovery that a silicone fluid having within each molecule of the fluid predominantly a combination of substantial amounts of methyl and ethyl groups could be used in the production of coating compositions with outstanding results. Ethyl-methyl polysiloxane was prepared, and found to have a number of unique and heretofore unrealized characteristics. This compound may be represented by the following formula, where $n$ indicates the degree of polymerization which has occurred during the formation of the silicone:

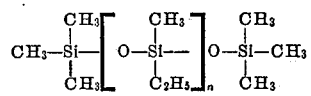

As shown, the ethyl-methyl polysiloxane has tri-methyl end blocks i. e., the silicone molecules are terminated by trimethyl silane radicals. However, it should be understood that the silicone may be readily prepared with triethyl end blocks, or end blocks containing a mixture of ethyl and methyl groups, and these materials will have substantially the same properties in this invention.

Apparently because of the presence of the methyl groups in each molecule, ethyl-methyl polysiloxane has excellent lubricity so that compositions incorporating the fluid can be easily spread over a surface. Yet the ethyl groups present in the ethyl-methyl polysiloxane molecule apparently impart to the fluid sufficient affinity for lacquered or enameled surfaces so that the fluids show little tendency to agglomerate even when used without the inclusion of wax. The compatibility of ethyl-methyl polysiloxane for the waxes is sufficient to impart excellent durability to films prepared from the fluid, but not so great as to have an appreciable plasticizing effect on the waxes, to impede buffing. In addition, the fluids are sufficiently compatible with lacquers or enamels to permit the formation of smooth unblemished finishes using the ordinary methods for cleaning a surface before the lacquer or enamel is applied.

Coating compositions may be prepared from ethylmethyl polysiloxane fluids which may be readily spread in evenly distributed films, even when no wax is employed in the composition. The compositions have excellent "lay down" and show little tendency to streak or "bronze." When wax is incorporated in the coating compositions, lustrous, hard, durable films may be produced which display a high resistance to smearing.

According to the present invention, when coating compositions are prepared using wax together with ethyl-methyl polysiloxanes, the compositions may be prepared as emulsions, or they may be prepared as solutions using mutual solvents such as the hydrocarbons. In either case, the silicone content improves the spreading characteristics, and facilitates the application and polishing of the compositions. If desired, other materials such as small amounts of abrasives can be used with the compositions to create compositions having cleaning characteristics.

Having indicated in a general way the nature and purpose of this invention, the following examples will serve to further illustrate the invention. It is to be understood that these examples are presented merely as illustrations of the invention and are not to be construed as limiting the same. The viscosity determinations herein were made at 25° C. In all examples the ethyl-methyl polysiloxanes employed had tri-methyl end blocks.

*Example I*

6 parts carnauba wax and 14 parts microcrystalline paraffin wax were placed in a suitable vessel and the wax was melted by raising the temperature to approximately 210° F. In another vessel 20 parts naphtha having a distillation range of 290 and 350° F., and an aniline point of 138° F. was admixed with 12 parts of ethyl-methyl polysiloxane having a viscosity of 520 centistokes, and 3.2 parts of paraffin oil. The contents of the two vessels were then mixed together and the temperature raised to approximately 180° F. or until a homogeneous mixture was obtained. This mixture was cooled to room temperature and then the mixture extended with 155 parts of heptane.

A portion of the above composition was incorporated in an aerosol bomb, the above composition constituting 15% by weight of the contents of the bomb, the remaining 85% consisting of a condensable gas, difluoro-dichloromethane. The material was sprayed on an automobile and upon drying, was easily buffed to a lustrous finish.

*Example II*

15 parts carnauba wax, 11 parts microcrystalline paraffin wax, and ½ part aluminum stearate were placed in a suitable vessel and the mixture melted by raising the temperature to about 210° F. In another vessel, 60 parts of naphtha having a distillation range of 370–460° F. and an aniline point of 145° F. was admixed with 2 parts of ethyl-methyl polysiloxane having a viscosity of 123 centistokes. The contents of the two vessels were mixed together and the temperature raised to about 180° F. or until a homogeneous mixture was obtained. The mixture was then extended with 110 parts naphtha of the type used above, and subsequently cooled.

A portion of the above composition was incorporated in an aerosol bomb, the above composition constituting 75% by weight of the bomb, the remainder of the weight being difluorodichloromethane. The material in the bomb was released from the bomb (it had a pasty consistency), and upon spreading and drying, was easily buffed to a lustrous finish.

*Example III*

1 part of microcrystalline paraffin wax was placed in a suitable vessel and melted by raising the temperature to about 250° F. 193 parts of naphtha having a distillation range of 300–335° F. and an aniline point of 130° F. was heated to a temperature of 185° F. and then admixed with the molten microcrystalline wax. 8 parts of ethyl-methyl polysiloxane, having a viscosity of 520 centistokes, was then added to the wax solution with agitation. The composition was subsequently cooled and a portion applied to a lacquered metal finish. The film, when buffed, produced a high luster which showed little reduction in gloss after weathering for 4 weeks.

*Example IV*

Following the procedure of Example II, a protective coating composition was prepared from 3 parts carnauba wax, 2 parts microcrystalline paraffin wax, 7 parts ethyl-methyl polysiloxane having a viscosity of 1700 centistokes, and 200 parts of "Stoddard" solvent. After cooling, a portion was applied to a lacquered metal finish. The film, when buffed, produced a high luster which showed little reduction in gloss after weathering for four weeks.

*Example V*

Following the procedure of Example II, a protective coating composition was prepared from 8 parts microcrystalline paraffin wax, 1 part ethyl-methyl polysiloxane having a viscosity of 3400 centistokes, and 200 parts naphtha having the properties of the naphtha used in Example I. After cooling, a portion was applied to a lacquered metal finish. The film, when buffed, produced a high luster which showed little reduction in gloss after weathering for 4 weeks.

*Example VI*

A protective composition was prepared by mixing 10 parts ethyl-methyl polysiloxane having a viscosity of 123 centistokes with 200 parts naphtha having the properties of the naphtha used in Example I. A portion was applied to a lacquered metal finish. The film, when buffed produced a high luster which showed little reduction in gloss after weathering for 4 weeks.

*Example VII*

A liquid protective coating composition was produced by melting 162 parts of oxidized microcrystalline paraffin and 12 parts microcrystalline paraffin in a suitable vessel at a temperature of approximately 200° F. 5160 parts of naphtha having the properties of the naphtha used in Example I was admixed at room temperature with 100 parts of ethyl-methyl polysiloxane having a viscosity of 742 centistokes. The naphtha mixture was then added to the molten wax and the temperature of the resultant mixture brought to approximately 150° F. With vigorous agitation, 540 parts of water was added. Agitation was continued until the temperature of the mixture had dropped to 85° F.

Cloths were wetted with the product and the wet cloths were moved lightly over the surface of mahogany stained wood panels which had water soluble spots on their surfaces. The panels were then allowed to dry with the formation of a white powdery dust on the surface of the panels. The panels were then buffed resulting in a continuous glossy and spot-free surface.

*Example VIII*

190 parts naphtha (having the physical characteristics as that used in Example I) and 25 parts ethyl-methyl polysiloxane were admixed and heated to about 150° F. 60 parts of diatomaceous earth was then added to this silicone solution and the mixture thoroughly mixed. 35 parts carnauba wax and 35 parts microcrystalline paraffin (molten mixture at about 320° F.) were then added with mixing. To this wax-silicone mixture was finally added while stirring 150 parts water (140° F.) and 40 parts diatomaceous earth, in that order. The resulting composition was then homogenized by passing the mixture through an orifice plate, and cooled moderately slowly.

A portion of the composition was then applied to a lacquered surface which had oxidized slightly and had a chalky appearance. The composition was spread with rubbing, and immediately wiped off to produce a lustrous finish.

It has been found that those ethyl-methyl polysiloxane fluids having a viscosity of between about 20 and 15,000 centistokes at 25° C. are the most satisfactory. Those fluids having viscosities lower than 20 centistokes tend to have excessively high vapor pressures so that a durable film usually is difficult to obtain. On the other hand, the more viscous silicones having viscosities greater than 15,000 centistokes tend to produce smeared films which are hard to buff.

It should be appreciated that other liquid organic solvents would be suitable in preparing the compositions of this invention, these solvents including hydrocarbons, hydrocarbon ethers, and chloro-substituted hydrocarbons. Operable solvents would include such solvents as naphtha, "Stoddard" solvent, chloro-substituted hydrocarbons such as carbon tetrachloride, ethylene dichloride, perchloroethylene, and trichloroethylene, and hydrocarbon ethers, such as ethyl, hexyl, or methyl ethers. In general, the aniline points for these solvents should preferably lie between about 50 and 185° F. Those solvents having aniline points at the lower end of this range tend to have such solvency strength that the ordinary varnish, lacquer, or enamel finishes would be damaged by the solvent. Those solvents having an aniline point at the upper end of the range have been found to possess insufficient solvency strength as required by the wax used. Aniline points as used herein were determined by the conventional method prescribed by the American Society for Testing Materials. In general, solvents have been included so as to transform the silicone compositions, including any wax present, into compositions having a viscosity which permit them to be applied readily to surfaces, these solvents being miscible with the silicone fluids and dissolving portions of the wax, if any, which may be used. The solvent also serves to clean surfaces of any organic soluble residues which may be on a surface.

It should further be appreciated that for optimum results the liquid organic solvents used in preparing the compositions of this invention should be volatile enough to bring about rapid drying after the composition has been applied, and yet not so volatile as to dry up before spreading of the composition has been accomplished. It has been found generally that the most satisfactory results were obtained when the solvent used had a distillation range where the lower limit of the range is above about 190° F. and the upper limit of the range is below about 460° F. These distillation range values were determined by the method prescribed by the American Society for Testing Materials.

It may be desirable to include water in the silicone compositions of this invention. It has been found for instance, that wood surfaces, such as desks, tables, etc., frequently collect spots which are water soluble, but not organic solvent soluble. The water, therefore, may be included in the coating compositions as a cleaning agent. In those cases where the compositions contain wax, the water may serve in addition to regulate the particle size of the wax contained by the composition, since in most instances all the wax is not dissolved by the solvent and undissolved wax particles are present. Thus the inclusion of water is often desirable in order to make the compositions stable.

In some instances where water is used, an emulsifying agent may be desirable. These emulsifiers, however, usually tend to make the compositions more susceptible to water-spotting after they have been applied. However, if the water is maintained at a low enough concentration, in the range of not more than 20 or 25%, usually emulsifiers are not necessary. This has been found to result by reason of the fact that the wax will disperse the water in the form of droplets, covering the water droplets with a film of wax.

Due in part to the affinity shown by the silicone fluids used herein for ordinary surfaces, the compositions of this invention have been found to spread evenly, adhere to surfaces, and produce satisfactory gloss and water resistance without the inclusion of wax. However, if it is desired to add to the durability of a coating, to reduce water spotting, or in some instances to increase the depth of gloss, wax may be employed in addition to the silicone fluids. Experience has shown that quite satisfactory results were obtained when the ratio of wax to silicone in the composition reached as high as 10 parts wax to 1 part polysiloxane. A greater amount of wax may be employed, but the effect of the silicone fluids then becomes quite insignificant.

This invention is generally without restriction as to the type of wax employed, contemplating mineral wax as a class, such as paraffin wax, (which is meant to include microcrystalline and oxidized paraffins) montan wax, ozokerite, and the like; vegetable wax as a class, such as carnauba wax, candellila, ouricury, palm wax and the like; animal wax as a class, such as beeswax, whale wax, and the like; and, of course, recently developed synthetic waxes.

Articles which have been treated with the compositions of this invention may be readily refinished provided the ordinary methods for cleaning surfaces are used. For example, the surface may be first cleaned with a solvent such as turpentine and properly sanded, to produce a surface that is sufficiently cleaned for refinishing. Lacquers or enamels may then be applied to the surface, and a smooth finish may be obtained.

While various embodiments of this invention have been described, it should be understood that the invention is not restricted thereto, and that it is intended to cover all modifications of the invention which would be apparent to one skilled in the art and that come within the scope of the appended claims.

This application is a continuation-in-part of prior application filed October 5, 1955, and having Serial No. 538,779, now abandoned.

It is claimed and desired to secure by Letters Patent:

1. A surface finish composition consisting essentially of an organopolysiloxane having predominately a combination of substantial amounts of both methyl and ethyl groups attached to the silicon atoms of each organopolysiloxane molecule, said organopolysiloxane having a viscosity of between about 20 and about 15,00 centistokes at 25° C., a liquid organic solvent entirely miscible with said organopolysiloxane having an aniline point between about 50° F. and about 185° F. and a distillation range of between about 190° F. and about 460° F., and a wax in a quantity up to about 10 parts by weight per each part by weight of polysiloxane, the ratio of said solvent to said wax and said polysiloxane being such that the solvent functions as a mutual solvent-dispersant for the polysiloxane and wax permitting said composition to be readily applied to surfaces in thin evenly distributed films.

2. A surface finish composition consisting essentially of methyl-ethyl polysiloxane having a viscosity of between about 20 and about 15,000 centistokes at 25° C., a liquid organic solvent entirely miscible with said organopolysiloxane having an aniline point between about 50° F. and about 185° F. and a distillation range of between about 190° F. and about 460° F., and a wax in a quantity up to about 10 parts by weight per each part by weight of polysiloxane, the ratio of said solvent to said wax and said polysiloxane being such that the solvent functions as a mutual solvent-dispersant for the polysiloxane and wax permitting said composition to be readily applied to surfaces in thin evenly distributed films.

3. A surface finish composition consisting essentially of an organopolysiloxane having predominately a combination of substantial amounts of both methyl and ethyl groups attached to the silicon atoms of each organopolysiloxane molecule, said organopolysiloxane having a viscosity of between about 20 and about 15,000 centistokes at 25° C., a liquid organic solvent entirely miscible with said organopolysiloxane selected from the group consisting of hydrocarbons, ethers, chloro-substituted hydrocarbons and mixtures thereof having an aniline point between about 50° F. and about 185° F. and a distillation range of between about 190° F. and about 460° F., and a wax in a quantity up to about 10 parts by weight per each part by weight of polysiloxane, the ratio of said solvent to said wax and said polysiloxane being such that the solvent functions as a mutual solvent-dispersant for the polysiloxane and wax permitting said composition to be readily applied to surfaces in thin evenly distributed films.

4. A surface finish composition consisting essentially of methyl-ethyl polysiloxane having a viscosity of between about 20 and about 15,000 centistokes at 25° C., and a liquid organic solvent entirely miscible with said organopolysiloxane selected from the group consisting of hydrocarbons, ethers, chloro-substituted hydrocarbons and mixtures thereof having an aniline point between about 50° F. and about 185° F. and a distillation range of between about 190° F. and about 460° F., and a wax in a quantity up to about 10 parts by weight per each part by weight of polysiloxane, the ratio of said solvent to said wax and said polysiloxane being such that the solvent functions as a mutual solvent-dispersant for the polysiloxane and wax permitting said composition to be readily applied to surfaces in thin evenly distributed films.

References Cited in the file of this patent
UNITED STATES PATENTS

| | | |
|---|---|---|
| 2,733,154 | Taylor | Jan. 31, 1956 |
| 2,742,368 | Rossiter et al. | Apr. 17, 1956 |

UNITED STATES PATENT OFFICE
CERTIFICATE OF CORRECTION

Patent No. 2,868,657                                  January 13, 1959

Louis M. Sesso

It is hereby certified that error appears in the printed specification of the above numbered patent requiring correction and that the said Letters Patent should read as corrected below.

Column 6, line 43, for "15,00 centistokes" read -- 15,000 centistokes --.

Signed and sealed this 26th day of May 1959.

(SEAL)
Attest:
KARL H. AXLINE
Attesting Officer

ROBERT C. WATSON
Commissioner of Patents